United States Patent [19]

Cavallerano et al.

[11] Patent Number: 4,945,411
[45] Date of Patent: Jul. 31, 1990

[54] HDNTSC CHANNEL WITH TIME AND FREQUENCY MULTIPLEXING

[75] Inventors: Alan P. Cavallerano, Ossining; Carlo Basile, Flushing; Mikhail Tsinberg, Riverdale, all of N.Y.

[73] Assignee: North American Philips Corporation, New York, N.Y.

[21] Appl. No.: 239,148

[22] Filed: Aug. 31, 1988

[51] Int. Cl.$^5$ .............................................. H04W 7/04
[52] U.S. Cl. .................................... 358/141; 358/142
[58] Field of Search ............... 358/140, 141, 142, 146, 358/11, 12

[56] References Cited

U.S. PATENT DOCUMENTS

| | | | |
|---|---|---|---|
| 4,661,850 | 4/1987 | Strolle et al. | 358/140 |
| 4,794,447 | 12/1988 | Tsinsberg | 358/141 |
| 4,816,899 | 3/1989 | Strolle et al. | 358/141 |

FOREIGN PATENT DOCUMENTS 62-206992 11/1987 Japan .

Primary Examiner—James J. Groody
Assistant Examiner—David E. Harvey
Attorney, Agent, or Firm—Michael E. Marion

[57] ABSTRACT

A high definition television encoder which provides an efficient use of bandwidth, segments line differential signals into left panel, center segment, and right panel line differential signals and time expands the left and right panel line differential, panel, and luminance signals. The time corresponding expanded left and right panel line differential signals are arranged in time coincidence and quadrature modulated, as are the corresponding segments of the panel signals. The quadrature modulations providing signals in contiguous frequency bands. Luminance signals are converted to a band abutting the contiguous frequency bands as are digital audio signals. The digital audio signals, quadrature modulated signals and luminance signals are frequency multiplexed within a 3 MHz band.

14 Claims, 4 Drawing Sheets

| COMPONENTS | ORIGINAL TIMEBASE & BASE BANDWIDTH | EXPANSION FACTOR | TIMEBASE & BASE BANDWIDTH |
|---|---|---|---|
| LD2 PL2 & PR2 | 7.1 μSEC 3.3 MHz | 2:5 | 17.75 μSEC 1.32 MHz |
| LD4 PL4 & PR4 | 7.1 μSEC 3.3 MHz | 2:5 | 17.75 μSEC 1.32 MHz |
| Yh | 26 μSEC 5.6 MHz | 1:2 | 52.00 μSEC 2.8 MHz |
| NTSC PL1 & PR1 | 18.9 μSEC 4.2 MHz | 1:3 | 56.7 μSEC 1.4 MHz |
| NTSC PL3 & PR3 | 18.9 μSEC 4.2 MHz | 1:3 | 56.7 μSEC 1.4 MHz |
| DSS | 127.11 μSEC 440 Kbps | QPSK | 127.11 μSEC 0.2 MHz (total bandwidth) |

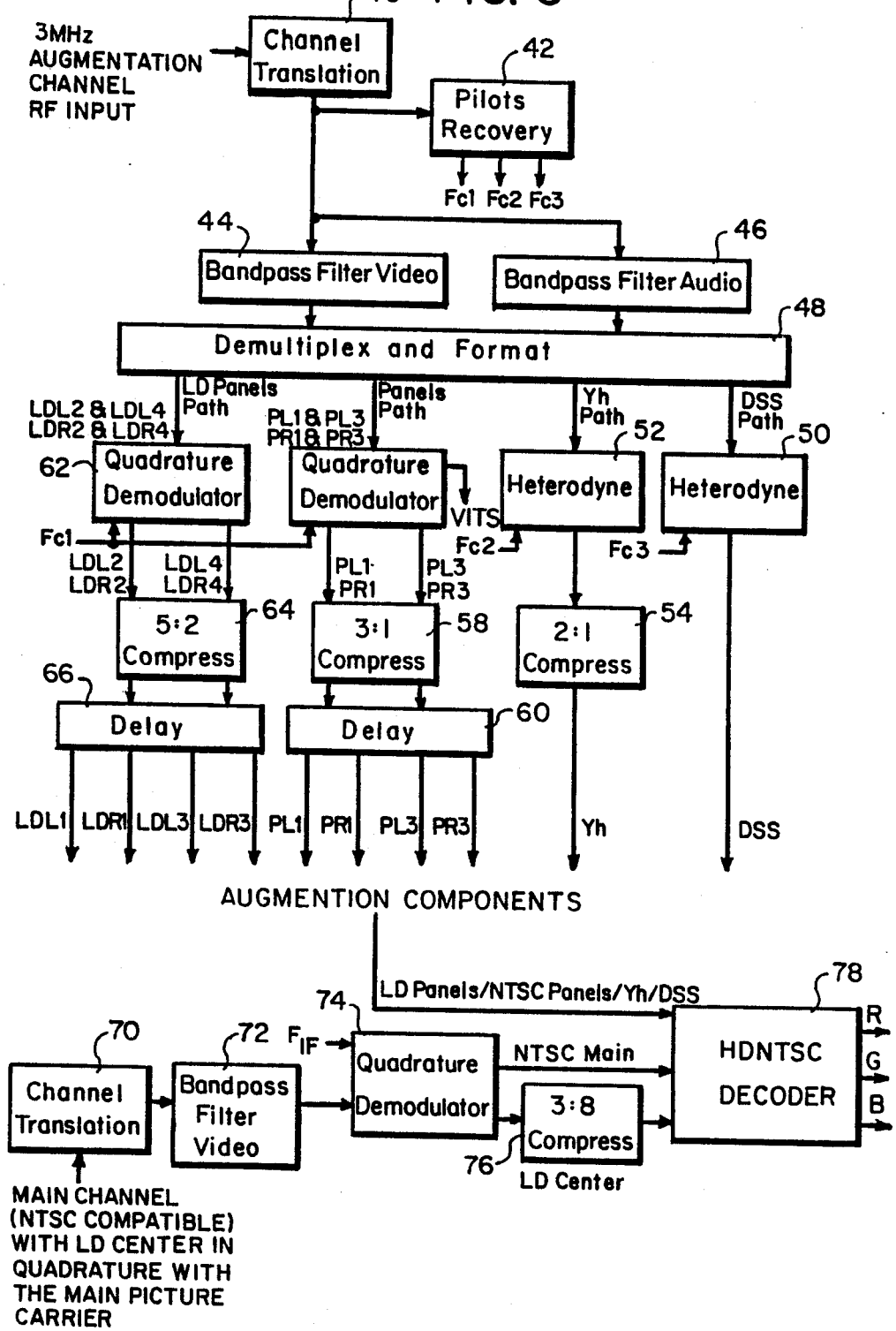

HDNTSC CHANNEL WITH TIME AND FREQUENCY MULTIPLEXING

BACKGROUND OF THE INVENTION

1. Field of the Invention

The invention pertains to television information transmission and reception and more particularly to the transmission and reception of high definition television signals comprising augmentation panels to the left and right of an NTSC compatible center panel, high frequency luminance, and stereo high fidelity audio.

2. Description of the Prior Art

Conventional, for example NTSC, color television systems transmit picture information at a rate of 59.94 picture fields per second, two constituting a frame, each frame consisting of 525 horizontal scan lines. To reduce the transmission and reception bandwidths required to reproduce the transmitted picture, these horizontal scan lines are interlaced from field-to-field with a ratio of two-to-one, that is only every other scan line is transmitted in each field. Scan lines omitted in one field are transmitted in the next succeeding field, thus all the odd numbered fields contain one set of scan lines and the even numbered fields contain the set of scan lines which interlace with the scan lines in the odd numbered fields. This arrangement permits the transmission, reception, and picture reproduction at bandwidths reduced from that required for every scan line to be transmitted in each frame.

Television pictures reproduced in these conventional systems have an aspect ratio of four to three, i.e. for every four units of horizontal width there are three units of vertical height. High definition television (HDTV) systems may utilize TV screens with aspect ratios that are increased from the conventional 4:3 to aspect ratios of 16:9 and can provide information for an entire image frame without field interlacing, thus providing improved picture resolution. To maintain compatibility with existing TV receivers the HDTV source picture is divided into three panels, the center panel comprising the conventional TV picture and the augmentation for an HDTV display on an HDTV receiver contained in the panels on the left and right of this center panel. The augmentation signals for providing the left and right panels are transmitted separately from the conventional TV signals. These signals are combined in the HDTV receiver, while the augmentation signals are ignored by the conventional receivers. Additionally, sound quality is improved with the transmission of digital stereo audio of compact disc quality.

Techniques for providing HDTV-NTSC compatible television signals and augmentation signals are disclosed in U.S. patent applications: Ser. No. 057,847 filed Jun. 2, 1987; Ser. No. 057,849 filed Jun. 2, 1987; Ser. No. 122,148 filed Nov. 17, 1987; and Ser. No. 084,968 filed Aug. 13, 1987. All these applications are assigned to the assignee of the present invention and are incorporated herein by reference.

In addition to the information for extending the picture width, the augmentation signals include information for providing improved resolution by transmitting a line differential signal, and a high frequency chrominance and luminance component. As previously configured, these transmissions required a channel bandwidth of 6 MHz. It is the purpose of this invention to provide a system that transmits the augmentation information within a 3 MHz channel.

SUMMARY OF THE INVENTION

In accordance with the principles of the present invention HDTV signals, compatible with receivers, are provided with an efficient use of bandwidth so that the augmentation information, digital stereo audio, and digital synchronization may be transmitted within a 3 MHz bandwidth.

In accordance with the invention, second and fourth line differential signals of a four line cycle are divided into three segments, a left panel segment, a center segment, and a right panel segment. The left and right panel segments are time expanded, appropriately delayed, for the corresponding segments on the second and fourth line differential signals to be in time coincidence, and quadrature modulated on a subcarrier signal. The line differential central segment is time expanded to a time equal to the expanded active line time of conventional, e.g. NTSC systems and quadrature modulated with the NTSC signal. Left and right panel signals of the four line cycle are appropriately delayed for corresponding segments to be in time coincidence and quadrature modulated on the same subcarrier utilized by the line differential signals. High frequency luminance information is decimated vertically by selecting one line of the four line cycle for luminance transmission. This luminance signal is time expanded and heterodyned with a subcarrier signal at a frequency which positions a sideband of the heterodyning process in the frequency band occupied by the panel signals and the line differential panel signals. The signals resulting from the quadrature modulation of the panel signals, the quadrature modulation of the line differential panel signals, and the heterodyning of the high frequency luminance signal are time multiplexed and filtered. A digital signal packet (DSS) including a stereo audio signal of compact disc quality and a digital synchronization signal are heterodyned with a signal at a frequency which permits the sidebands of the heterodyning process to be frequency multiplexed with the quadrature modulated and Yh components within the desired 3 MHz band. The composite 3 MHz band is translated to the RF channel to amplitude modulate the picture carrier signal, wherein the carrier may be suppressed.

Since quadrature modulation is used only for signals which are highly correlated, quadrature errors only establish static errors at DC and slightly distort signals with sharp vertical transitions. Accurate quadrature demodulation and precise phase recovery at the receiver may be accomplished with the DSS packet cooperating with pilot bursts of the carriers and the vertical interval training signals (VITS), described in the incorporated patent applications.

BRIEF DESCRIPTION OF THE DRAWINGS

FIG. 6 is a block diagram of a HDNTSC decoder with a 3 MHz augmentation channel.

DESCRIPTION OF THE PREFERRED EMBODIMENTS

Figure 1:
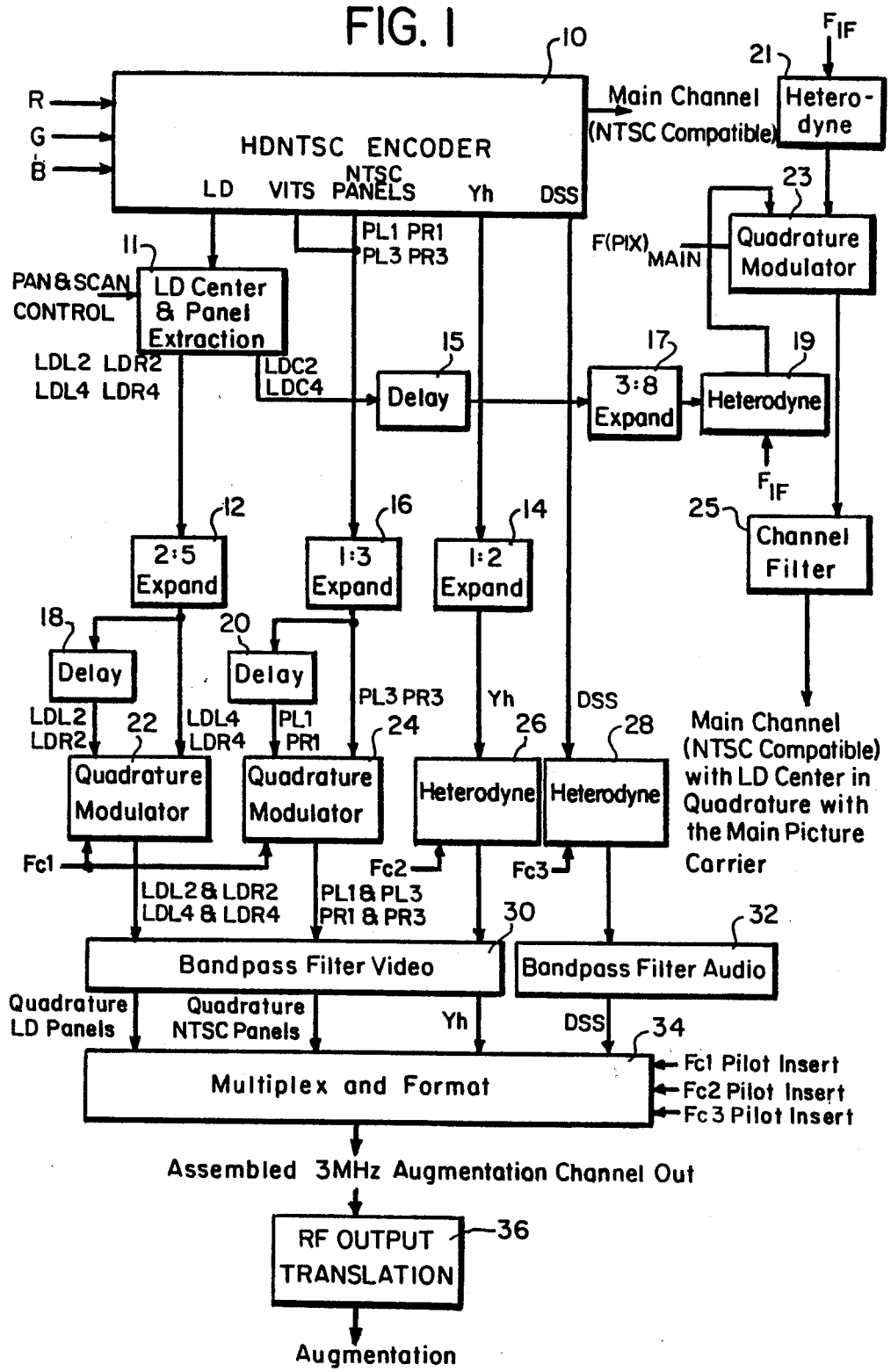
FIG. 1 is a block diagram a HDNTSC encoder with a 3 MHz augmentation channel.

Referring to FIG. 1, a HDNTSC encoder 10, as described in the incorporated patent applications separates the signals defining an image into three segments, left panel, center segment, and right panel. The center segment signals define a conventional television, (e.g., NTSC) image having a 4:3 aspect ratio, while the left and right panel signals provide the information for the remainder of an image having a 16:9 aspect ratio. Pan and scan techniques permit the center panel to be positioned anywhere within the confines of the overall 16:9 aspect ratio image, causing the left and right panels to vary, though the percentage of the overall image in these two panels remains constant. Though the source indicated in the figure is RGB, it should be recognized that an HDMAC-60 source may also be utilized. The HDNTSC encoder provides a superline which contains two line differential signals (LD2 and LD4), the segment of the first line in the left panel (PL1), the segment of the first line in the right panel (PR1), the segment of the third line in the left panel (PL3) the segment of the third line in the right panel (PR3), and a luminance signal Yh, and VITS all extracted from a sequence of four source lines.

LD signals are formed from complete horizontal scan lines and are generated for every other source line. These lines correspond to the second (LD2) and fourth (LD4) in the four source line cycle. LD2 is established by subtracting one half the sum of the first and third lines from the second line, while LD4 is established by subtracting one-half the sum of the third line and the first line in the next cycle from the fourth line. These LD signals have adjacent time slots on the super line and are provided at the LD output terminal of the encoder 10. Panel signals are extracted from the original line in the time sequence PL1 (first)/PR1/PL3/PR3-(last). The luminance signal Yh is provided by vertically decimating the high frequency luminance information in a manner which selects one source line in each cycle. In this way the diagonal resolution is limited, but tailored well to the human visual system.

LD signals from the encoder 10 are coupled to a center and panel extraction circuit 11, wherein the LD signals for the second and fourth source lines are separated into left panel, center segment, and right panel line differential signals, respectively designated, for LD2 and LD4, as LDL2 and LDL4, LDC2 and LDC4, and LDR2 and LDR4. Pan and scan control signals coupled to the extraction circuit 11 are utilized to establish the position of the constant time interval central segment line differential signals, LDC2 and LDC4, within a horizontal line scan time, and to establish the time intervals for the line differential signals in the left and right panels. This extraction is accomplished in the manner employed by the HDNTSC encoder 10 to separate the NTSC signals and generate the left and right panel augmentation signals.

Figures 2, 3:
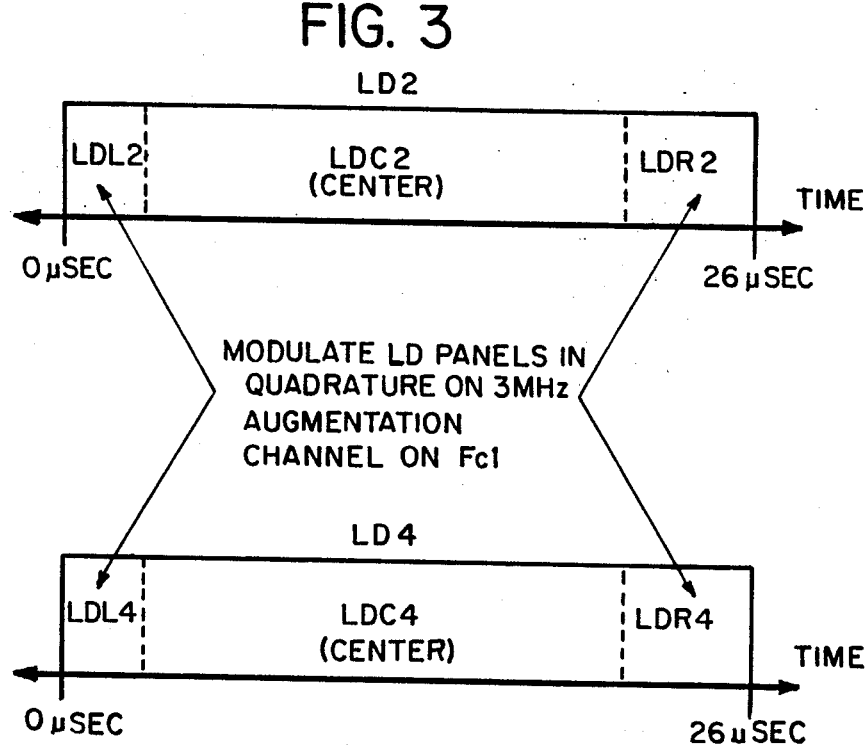
FIG. 2 illustrates the separation of line differential signals into left panel, right panel and center segments.
FIG. 3 is a component tabulation of time and frequency allocations for a 3 MHz augmentation channel.

The left and right line differential signals and video signals from the HDNTSC encoder 10 are time expanded to reduce signal bandwidth prior to further processing. The left and right panel LD signals are expanded by a factor of 2:5 in expansion circuits 12, the Yh signals are expanded by a factor of 1:2 in expansion circuit 14, while the left and right panel signals and the baseband VITS are time expanded by a factor of 1:3 in expansion circuit 16. The original time base and base bandwidth of the signals provided by the HDNTSC encoder 10 and the time base and base bandwidth established by these time expansions are shown in FIG. 2. These expansion factors achieve a signal-to-noise ratio improvement for the received picture over that provided by the prior art and reduce the impact of channel echoes, thereby realizing better ghost rejection.

Nominally, the LD line time is 26 usec; extraction of the 4:3 center out of the 16:9 total picture yields a factor of 75% [(4/3)/(16/9)] for the center segment, leaving 25% of the 26 usec or 6.5 usec for the left and right LD. An allowance of 0.6 usec for overlap redundancy during wide aspect ratio decomposition and recombination is added to the center segment time, thereby establishing a total time for the left and right LD of 7.1 usec.

Referring to FIG. 3, LD2 and LD4 are depicted as 26 usec of active picture content. Under pan and scan control, in tandem with pan and scan for the NTSC picture, LD2 is segmented into: LDL2, LDR2, and LDC2, and LD4 into: LDL4, LDR4, and LDC4. As stated above, the LD panels for each line are allotted 7.1 usec, with the center section being allotted 19.5 usec (75% of the nominal line time of 26 usec). After selection the LD center is delayed in delay circuit 15 to be in time alignment with the NTSC signals and coupled to a time expander 17 to be expanded by the same 3:8 factor applied to the NTSC signals. The delay establishes LDC2 in time alignment with the first NTSC source line in the cycle and LDC4 in time alignment with the third NTSC source line. Since the LD represents a vertical-temporal deinterlacing signal, it is highly correlated with the NTSC signal. Expansion of the LD center by the same factor applied to the NTSC signals maintains this correlation.

As shown in FIG. 2, the LD signal is band limited horizontally to 3.3 MHz by the NTCS encoder 10. After expansion the LD center line time is consistent with the nominal NTSC active line time of 52 usec $[(0.75) \times (26 \text{ usec}) \times (8/3) = 52]$. Time expansion by a 3:8 factor reduces the bandwidth of the LD center signal to nominally 1.2 MHz.

The delayed and time expanded LDC signals and the NTSC signals are respectively heterodyned in heterodyne circuits 19 and 21 with the same signal to provide time and frequency aligned LDC and NTSC signals. The upper side band signals of the heterodyning processes are quadrature modulated in modulator 23, filtered in channel filter 25 and passed to the transmitter.

The digital sound and synchronization (DSS) information may result, for example, from QPSK modulation of Dolby Adaptive Modulated (ADM) signals. The data rate for ADM is 408 kilobits, and an additional 32 kilobits per second may be added for synchronization, providing a total bit rate for the DSS packet of 440 kilobits per second. Using QPSK, the channel could accommodate two bits per hertz, which means that the DSS packet would require a nominal 0.2 MHz of total bandwidth continuously. Thus, to achieve a desired 3 MHz overall bandwidth, 2.8 MHz is allocated to the augmentation video signals.

After the time expansions, the LD2 panel segment signals are coupled through delay circuit 18 to emerge therefrom in time coincidence with the LD4 panel segment signals. Similarly the panel segment signals of the first line in the cycle are coupled through delay circuit 20 to emerge therefrom in time coincidence with the corresponding panel segment signals of the third line. As illustrated in FIG. 1, the LD time coincident signals are coupled to quadrature modulator 22, wherein corresponding segment signals, LDL2-LDL4 and LDR2-LDR4, are modulated in quadrature onto a subcarrier signal at a frequency $F_{c1}$. Similarly, the panel segment time coincident signals, PL1-PL3 and PR1-PR3, are coupled to quadrature modulator 24, wherein these signals are also modulated in quadrature onto the same subcarrier signal utilized for the LD signals. Though two quadrature modulators are shown in FIG. 1, it should be recognized that it is possible to use but one, since the LD and panel signals are provided in different time intervals.

Expanded Yh signals are coupled to a heterodyning circuit 26 wherein the Yh signals are heterodyned with a second subcarrier at a frequency $F_{c2}$. The frequency Fc2 is chosen to provide a sideband, as for example, the upper sideband in the same frequency band occupied by the quadrature modulated LD and panel signals.

The DSS signal packet comprising digital audio and synchsignals provided by the encoder 10 is not time expanded. These signals are coupled to a heterodyning circuit 28 and heterodyned therein with a third subcarrier signal having a frequency $F_{c3}$. The frequency $F_{c3}$ is chosen to position the double sideband signal, resulting from the heterodyning process, above and contiguous with the selected sideband of the Yh heterodyning, which for this example is the upper sideband. Selection of the upper sideband of the Yh modulation takes advantage of the natural rolloff of the Yh video signal. Though the upper side has been chosen in the example presented, the selection of the lower sideband is also possible. The lower frequency bound of the Yh signal is probably more energetic than the upper bound. Selection of the lower sideband, however, allows the channel filters to touch the upper bound of the Yh signal. This is more robust and since the effect of the channel filter will not be present on the lower bound of the Yh signal, may allow for better control of the frequency recombination of Yh with the baseband low-frequency component Y1 when reconstructing the total wideband luminance signal.

The quadrature modulated signals from modulators 22 and 24 and the selected sideband from heterodyning circuit 26 are coupled to bandpass filter 30, while the double sideband DSS signal from heterodyning circuit 28 is coupled to bandpass filter 32. These filters limit the bandwidth of the video components to 2.8 MHz and the bandwidth of the DSS packet to 0.2 MHz. The subcarrier frequencies are chosen so that filters 30 and 32 provide contiguous frequency bands to form a total bandwidth of 3 MHz.

Figure 4:
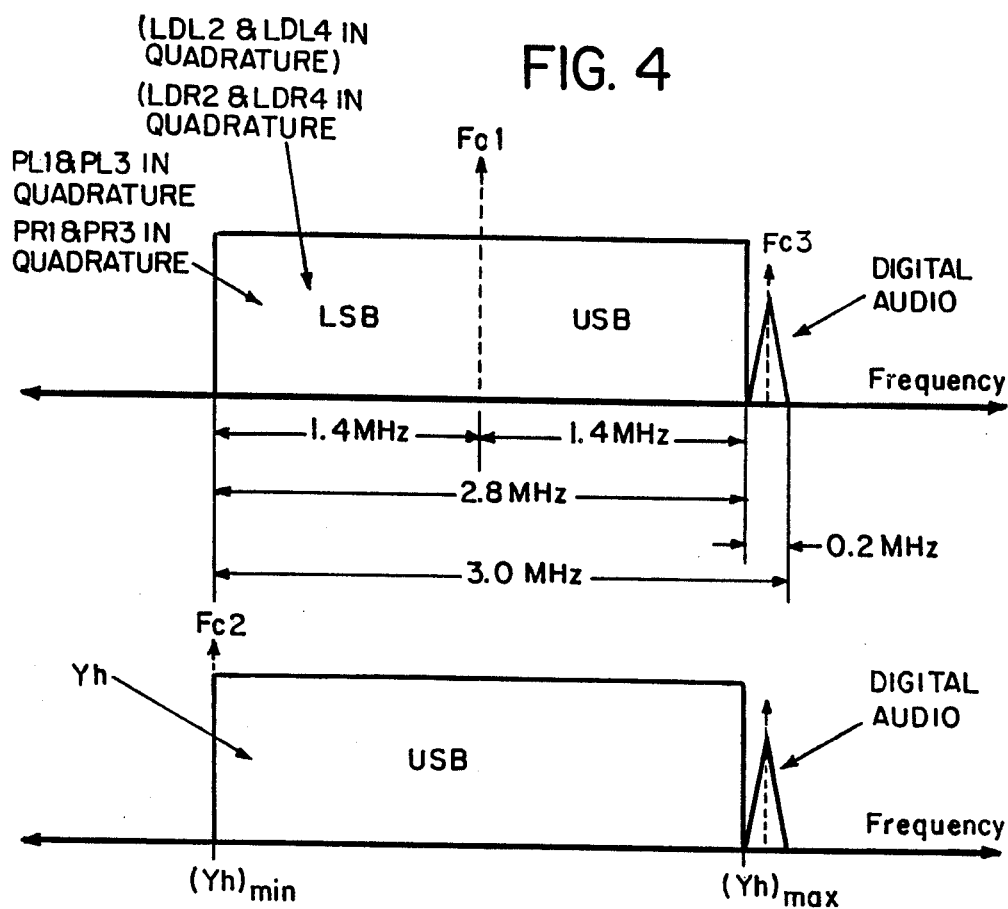
FIG. 4 is a diagram indicating the frequency allocation of the components in a 3 MHz augmentation channel.

After filtering, the signals are arranged in Frequency, as shown in FIG. 4. The quadrature modulated LD panel segment signals and panel signals occupy two side bands about the subcarrier $F_{c1}$, each sideband extending over a 1.4 MHz band, the composite sharing a 2.8 MHz band with upper side band of the heterodyned Yh signal. Contiguous to the 2.8 MHz is the 0.2 MHz bandwidth established by the DSS amplitude modulation of the subcarrier $F_{c3}$.

FIG. 2 lists the bandwidth of each sideband for the LD signal as 3.2 MHz. Since the bandwidth for the LD center segment, quadrature modulated with the NTSC, is limited to 1.25 MHz for compatibility with the NTSC signal, the entire LD signal must be so limited. In the vestigial sideband transmission of the NTSC signal, a 1.25 MHz wide, double sideband signal is transmitted. Since the LDC signal modulated with the NTSC signal has been expanded by a factor of 3:8, compressing the bandwidth by a 3:8 factor, the original base bandwidth of the entire LD must also be so compressed. To arrive at a 1.25 MHz band the original bandwidth of the LD signal must therefore be 3.3 MHz. The LD panel segments, however, are expanded by a factor of 2:5 for transmission in the 3 MHz augmentation channel which provides a bandwidth after time expansion, of 1.32 MHz. Since the Yh signal occupies the same frequency band and requires a 2.8 MHz band, after expansion, the LD panel segments are allotted 1.4 MHz per side band, as shown in FIG. 4.

Figure 5:
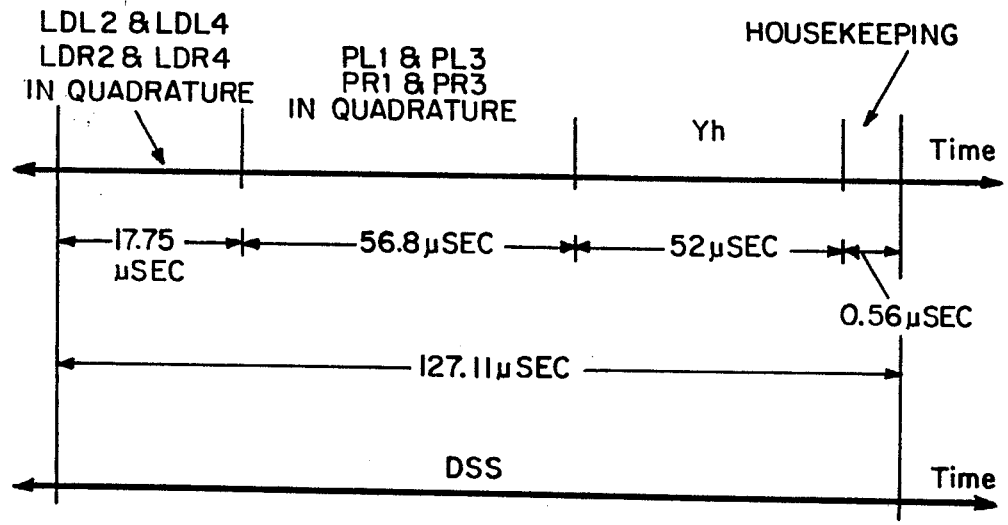
FIG. 5 is a diagram indicating the temporal allocations of the components in a 3 MHz augmentation channel.

The quadrature LD signals, quadrature panel signals, and the Yh selected sideband signals from bandpass filter 30 are coupled along with the amplitude modulated DSS signals from bandpass filter 32 to a multiplexer 34, wherein the signals are formatted and time multiplexed. Multiplexer 34, time arranges the LD signals, which utilize 17.75 usec, the panels signals, which utilize 56.8 usec, and the Yh signal, which utilizes 52 usec, as shown in FIG. 5. Time multiplexed with these three signals are housekeeping signals, which include pilot bursts of the subcarrier reference frequencies for proper phase recovery at the encoder. Housekeeping signals are allotted 0.52. Thus, the time multiplexed signals utilize 127.11 usec, as do the DSS signals. After establishing the time multiplexing, multiplexer 34 formats the signals and combines the time multiplexed signals with the DSS signals from bandpass filter 32 to establish the frequency multiplexing of the time multiplexed and DSS signals.

As described above, time multiplexing of the video signals is performed after bandpass filtering. It should be recognized that the video signals may be time multiplexed after quadrature modulation and heterodyning, then bandpass filtered.

The 3 MHz augmentation channel is assembled in the multiplexer 34 at a selected intermediate frequency (IF) and is coupled therefrom to translation circuit 36, wherein it is frequency translated for transmission at a radio frequency (RF).

Refer now to FIG. 6 which is a block diagram of a preferred augmentation channel decoder. The RF signal, modulated with the 3 MHz augmentation channel is converted to an IF signal at a predetermined frequency by a channel translator 40. This IF signal is coupled to a pilots recovery circuit 42 wherein the subcarrier signals $F_{c1}$, $F_{c2}$, and $F_{c3}$ are generated to be utilized for the recovery of the video and audio signals. The IF signal is also coupled to a frequency demultiplexer comprising bandpass filter 44, which extracts the video signals, and bandpass filter 46, which extracts the audio signals. The frequency demultiplexed signals are coupled to a time demultiplexer-formator 48 wherein the video signals are time separated and the time demultiplexed video signals and the audio signals are formatted for further processing.

DSS signals from the demultiplexer-formator 48 and the subcarrier $F_{c3}$, generated by the pilots recovery circuit 42, are coupled to heterodyning circuit 50 wherein these signals are heterodyned to recover the DSS signals. This signal provides 440 kilobits per second of continuous data representing ADM audio and digital sync required for the timing circuits.

Similarly, the Yh signal from demultiplexer-formator 48 and the subcarrier $F_{c2}$ are coupled to heterodyning circuit 52 wherein these signals are heterodyned to recover the time expanded Yh signals. The time expanded Yh signals are compressed in a 2:1 time compressor 54 wherefrom the desired Yh signal is provided for addition with the low frequency luminance signal.

Panel signals from the demultiplexer-formator 48 and the subcarrier signal $F_{c1}$, generated by the pilots recovery 42, are coupled to quadrature demodulator 56. The panels signals were quadrature modulated and time multiplexed prior to transmission. PL1 and PL3 were modulated in quadrature followed in time by the quadrature modulation of PR1 and PR3. Consequently, as shown in FIG. 5, one output terminal of quadrature modulator 56 provides PL1 and PR1, while a second output terminal provides PL3 and PR3. PL1 and PL3 appear in time coincidence at the output terminals as do PR1 and PR3. The VITS, which was modulated as part of the original baseband panels at the transmitter, are also demodulated by quadrature demodulator 56 and made available for downstream processing in the HDNTSC decoder.

The demodulated panel signals are coupled to a time compressor 58 wherein a 3:1 compression is applied to remove the expansion factor applied by the encoder. Compressed panel signals are coupled to delay circuits 60 wherein the panel signals are repositioned to provide the proper order of PL1(first)/PR1/PL3/PR3(last).

LD signals from demultiplexer-formator 48, which are LDL2 and LDL4 signals modulated in quadrature and LDR2 and LDR4 signals modulated in quadrature, are coupled, along with the subcarrier signal $F_{c1}$, to a quadrature demodulator 62. One output terminal of quadrature demodulator 62 provides LDL2 and LDR2, while a second output terminal provides LDL4 and LDR4. LDL2 and LDL4 emerge in time coincidence at the output terminals as do LDR2 and LDR4.

The demodulated LD panel segment signals are coupled to a time compressor 64 wherein a 5:2 compression is applied to remove the expansion factor applied by the encoder. Compressed LD panel signals are coupled to delay circuits 66 wherein the panel signals are repositioned to provide the proper order of LDL2(first)/LDR2/LDL4/LDR4(last).

Though two quadrature demodulators are shown in FIG. 5, as mentioned during description of the encoder, one quadrature detector would suffice for the detection of the LD and panel signals.

The LD center segment signal was quadrature modulated with the picture carrier of the NTSC signals. This quadrature modulated signal is frequency translated to an intermediate frequency in a channel translator 70 and bandpass filtered in filter 72 prior to being coupled, along with a local oscillator signal at the intermediate frequency, to a quadrature demodulator 74 wherefrom the LDC signal emerges from one output terminal and the NTSC signal from a second output terminal. The LDC signal is then compressed by a 3:8 factor in time compressor 76. An HDNTSC decoder 78 receives the decompressed LDC signals, the NTSC signals, and the augmentation components from the augmentation channel and combines these signals to reconstruct the HDNTSC image signals coupled to the HDNTSC encoder.

While the invention has been described in its preferred embodiments, it is to be understood that the words which have been used are words of description rather than of limitation and that changes within the purview of the appended claims may be made without departure for the true scope and spirit of the invention in its broader aspects.

We claim:
1. A high definition television apparatus comprising:
  means for generating high definition television augmentation signals including line differential signals, panel signals, and luminance signals, a digital signal packet comprising audio and synchronization signals, and conventional television image signals:
  means coupled to said generating means for segmenting said line differential signals into a center segment corresponding to said conventional television image signals and panel signals comprising right and left panel segments, thereby providing line differential center segment signals and line differential panel signals;
  means coupled to said generating means and said segmenting means for time expanding said panel signals so as to form time expanded panel signals comprising time expanded left and right panel segments thereof, said luminance signals so as to form time expanded luminance signals, and said line differential panel signals so as to form time expanded line differential panel signals comprising time expanded left and right line differential panel segments;
  means coupled to said expanding means for time multiplexing said time expanded line differential panel signals, said time expanded panel signals, and said time expanded luminance signals, thereby providing a time multiplexed signal comprising said time expanded line differential panel signals, said time expanded panel signals, and said time expanded luminance signals in respective time intervals;
  means coupled to said generating means and said time multiplexing means for frequency multiplexing said time multiplexed signal and said digital signal packet, thereby providing a frequency multiplexed signal comprising said time multiplexed signal in a first frequency band and said digital signal packet in a second frequency band;
  means coupled to said segmenting means for time expanding said line differential center segment signals to be of a time duration consistent with a horizontal line time of said conventional television image signals thereby providing time expanded line differential center segment signals;
  means for combining said time expanded line differential center segment and said conventional television image signals for transmission.

2. The apparatus of claim 1 wherein said time multiplexing means includes modulation means coupled to receive said time expanded line differential panel signals and said time expanded panel signals for providing quadrature modulated line differential panel signals and quadrature modulated panel signals.

3. The apparatus of claim 2 wherein said modulation means includes:
  delay means coupled to said expanding means for positioning time expanded left line differential panel segments in time coincidence, time expanded right line differential panel segments in time coincidence, time expanded left panel segments of said panel signals in time coincidence, and time expanded right panel segments of said panel signals in time coincidence; and quadrature modulator means coupled to said delay means for quadrature modulating said time expanded left and right line differential panel segments and for quadrature modulating said time expanded left and right panel segments of said panel signals, thereby providing quadrature modulated signals within a preselected frequency band.

4. The apparatus of claim 3 wherein said time multiplexing means further includes means coupled to said expanding means for frequency shifting said time expanded luminance signals to said preselected frequency band.

5. The apparatus of claim 4 wherein said frequency multiplexing means includes means coupled to said generating means for converting said digital signals packet to a predetermined frequency band contiguous with said preselected frequency band.

6. The apparatus of claim 5 wherein said preselected frequency band and said predetermined frequency together encompass a 3 MHz bandwidth.

7. The apparatus of claim 6 wherein said preselected frequency band is 2.8 MHz and said predetermined frequency band is 0.2 MHz.

8. The apparatus of claim 5 wherein:

said quadrature modulation of said line differential panel signals and said quadrature modulation of said panel signals utilize a common first subcarrier signal at a predetermined frequency Fc1;

said frequency shifting means includes first heterodyning means coupled to receive said time expanded luminance signal and a second subcarrier signal at a preselected frequency Fc2 for heterodyning said time expanded luminance signal with said second subcarrier to provide a signal having a sideband in said preselected frequency band, thereby shifting said time expanded luminance signal to said preselected frequency band; and said converting means includes second heterodyning means coupled to receive said digital signal packet and a third subcarrier signal at a predetermined frequency Fc3 for heterodyning said digital signal packet with said third subcarrier to provide a signal in said predetermined frequency, band, thereby shifting said digital signal packet to said predetermined frequency band contiguous with said preselected frequency band.

9. The apparatus of claim 8 wherein said center segment time expanding means includes:

means coupled to said segmenting means for time aligning said line differential center segment signals with said conventional television image signals; and a time expander coupled between said time aligning means and said combining means, thereby providing line differential center segment signals correlated with said conventional television image signals.

10. The apparatus of claim 8 wherein said combining means includes means for quadrature modulating said time expanded line differential center segment means with said conventional television image signals.

11. The apparatus of claim 10 wherein said combining means further includes means coupled to receive said time expanded line differential center segment signals and said NTSC image signals for heterodyning said time expanded line differential center segment signals and said conventional television image signals with a signal at a predetermined frequency.

12. The apparatus of claim 8 wherein said time expanding means time expands said line differential panel signals in accordance with a 2:5 ratio, line differential center segment signals in accordance with a 3:8 ratio, said panels signals in accordance with a 1:3 ratio and said luminance signals in accordance with a 1:2 ratio, and center segment expanding means expands said line differential center segment in accordance with a 3:8 ratio.

13. A high definition television apparatus comprising:

means for receiving image signals including line differential center segment signals quadrature modulated with television image signals, a digital signal packet comprising audio and synchronization signals converted to a preselected frequency band, frequency multiplexed with a signal having time multiplexed signal components including quadrature modulated time expanded line differential panel signals, quadrature modulated time expanded panel signals, time expanded luminance signals converted to a predetermined frequency band, and subcarrier pilot signals at frequencies Fc1, Fc2, and Fc3;

means coupled to said receiving means for generating subcarrier signals at frequencies Fc1, Fc2, and Fc3 from said subcarrier pilot signals;

means coupled to said receiving means for demultiplexing said frequency multiplexed signal to obtain said converted digital signal packet and said time multiplexed signal;

means coupled to receive said converted digital signal packet and subcarrier signal at frequency Fc3 for providing said digital signal packet;

means coupled to receive said time multiplexed signal for time demultiplexing said time multiplexed signal to provide said time expanded line differential panel signals, said time expanded panel signals, and said time expanded luminance signals;

means coupled to receive said time expanded line differential panel line signals, said time expanded panel signals, and said subcarrier at frequency Fc1 for quadrature demodulating said time expanded differential line signals and said time expanded panel signals to obtain time expanded left and right panel line differential signals and time expanded left and right panel signals;

means coupled to receive said converted time expanded luminance signals and said subcarrier at frequency Fc2 for providing said time expanded luminance signal;

means coupled to receive said time expanded left and right panel differential signals, said time expanded left and right panel signals, and said time expanded luminance signals for compressing said time expanded signals to obtain left and right panel line differential signals, left and right panel signals, and luminance signals;

means coupled to receive said left and right panel line differential signals and said left and right panel signals for providing left and right panel line differential signals, and left and right panel signals in their original time sequence;

means coupled to said receiving means for demodulating said image signals to obtain said line differential center segment signals and said television image signals; and means for combining said left and right panel line differential signals in said original time sequence, said left and right panel signals in said original time sequence, said line differential center segment signals, and said television image signals to provide a high definition television image.

14. A method for providing high definition television signals for transmission comprising the steps of:

generating conventional television signals, line differential signals, left and right panel signals, luminance signals, and a digital signal packet comprising audio and synchronization signals, separating said line differential signals into left panel line differential signals, center segment line differential signals, and right panel line differential signals;

time expanding said left and right panel line differential signals, said left and right panel signals, and said luminance signals to obtain time expanded left and right panel line differential signals, time expanded left and right panel signals, and time expanded luminance signals;

quadrature modulating said time expanded left and right panel line differential signals and said time expanded left and right panel signals, to obtain quadrature modulated time expanded left and right panel line differential signals and quadrature modulated time expanded left and right panel signals within a common frequency band;

converting said time expanded luminance signals to said common frequency band;

time multiplexing said quadrature modulated time expanded left and right panel line differential signals, said quadrature modulated time expanded left and right panel signals, and said time expanded luminance signals to obtain a time multiplexed signal;

converting said digital signal packet to occupy a frequency band contiguous with said common frequency band;

combining said time multiplexed signal and said digital signal pocket signal to establish a frequency multiplexed signal;

time expanding said center segment line differential signal to be of a time duration consistent with horizontal line durations of said television signals, thereby providing time expanded center segment line differential signals; and quadrature modulating said time expanded line differential signals with said conventional television signals.

* * * * *